United States Patent
Conway et al.

(10) Patent No.: US 10,761,795 B2
(45) Date of Patent: Sep. 1, 2020

(54) PRINTER DRIVER PROFILES

(71) Applicant: PrinterLogic, Inc., St. George, UT (US)

(72) Inventors: Wayne Wilfred Conway, London (CA); Corey Clint Ercanbrack, Washington, UT (US)

(73) Assignee: PrinterLogic, Inc., St. George, UT (US)

( * ) Notice: Subject to any disclaimer, the term of this patent is extended or adjusted under 35 U.S.C. 154(b) by 0 days.

(21) Appl. No.: 16/455,357

(22) Filed: Jun. 27, 2019

(65) Prior Publication Data

US 2020/0004484 A1    Jan. 2, 2020

Related U.S. Application Data

(60) Provisional application No. 62/692,535, filed on Jun. 29, 2018.

(51) Int. Cl.
*G06F 3/12*      (2006.01)

(52) U.S. Cl.
CPC ............ *G06F 3/1253* (2013.01); *G06F 3/126* (2013.01); *G06F 3/1254* (2013.01)

(58) Field of Classification Search
CPC ...... G06F 3/126; G06F 3/1253; G06F 3/1255; G06F 3/1208
See application file for complete search history.

(56) References Cited

U.S. PATENT DOCUMENTS

| 2002/0030852 A1* | 3/2002 | Matsuo | G06F 3/1226 358/1.15 |
| 2002/0145627 A1* | 10/2002 | Whitmarsh | G06F 8/38 715/745 |
| 2004/0137855 A1* | 7/2004 | Wiley | G06F 3/1204 455/88 |
| 2004/0190032 A1* | 9/2004 | Ferlitsch | G06F 3/1285 358/1.13 |
| 2005/0225795 A1* | 10/2005 | Nuggehalli | G06F 3/1228 358/1.15 |
| 2007/0216939 A1* | 9/2007 | Wada | G06F 3/1243 358/1.15 |
| 2007/0216944 A1* | 9/2007 | Furuya | G06F 3/1212 358/1.15 |

(Continued)

FOREIGN PATENT DOCUMENTS

GB      2356723 B   * 12/2003   .......... G06F 3/1254

OTHER PUBLICATIONS

International Search Report and Written Opinion issued for PCT Application No. PCT/US2019/039906 dated Oct. 1, 2019.

*Primary Examiner* — Ted W Barnes
(74) *Attorney, Agent, or Firm* — Austin Rapp

(57) ABSTRACT

A method for configuring, via a website, printer settings for a printer is described. The method includes determining a printer driver for the printer. The method also includes determining at least one printing profile scope of a set of printing profile scopes that includes the printer driver. The at least one printing profile scope includes a plurality of printer drivers. The method further includes determining at least one printing profile for the printer based on the at least one printing profile scope. The at least one printing profile is applicable to a plurality of printer drivers. The method additionally includes presenting the at least one printing profile.

20 Claims, 8 Drawing Sheets

(56) References Cited

U.S. PATENT DOCUMENTS

| | | | |
|---|---|---|---|
| 2007/0233834 A1* | 10/2007 | Hattori | G06F 3/1226 709/223 |
| 2007/0245358 A1* | 10/2007 | Hattori | H04L 67/34 719/321 |
| 2007/0292145 A1 | 12/2007 | Drose et al. | |
| 2008/0079975 A1* | 4/2008 | Ferlitsch | G06F 3/1205 358/1.13 |
| 2008/0180699 A1* | 7/2008 | Selvaraj | H04L 67/16 358/1.1 |
| 2008/0246988 A1* | 10/2008 | Ashton | G06F 3/1214 358/1.15 |
| 2009/0109473 A1* | 4/2009 | Kato | G06F 3/1256 358/1.15 |
| 2009/0201547 A1* | 8/2009 | Noguchi | G06F 3/1228 358/1.15 |
| 2010/0214598 A1* | 8/2010 | Hoppenot | G06F 3/1253 358/1.15 |
| 2010/0225958 A1* | 9/2010 | Selvaraj | G06F 3/1253 358/1.15 |
| 2010/0225959 A1* | 9/2010 | Selvaraj | G06F 3/1244 358/1.15 |
| 2011/0026071 A1* | 2/2011 | Xiao | G06F 3/1205 358/1.15 |
| 2011/0188064 A1* | 8/2011 | Awata | G06F 3/12 358/1.13 |
| 2012/0019864 A1* | 1/2012 | Mickeleit | G06F 3/1224 358/1.15 |
| 2012/0194850 A1* | 8/2012 | K. | G06F 3/1204 358/1.15 |
| 2012/0218576 A1* | 8/2012 | Sekine | G06F 3/122 358/1.13 |
| 2012/0281251 A1* | 11/2012 | Salgado | G06F 3/1204 358/1.15 |
| 2013/0163014 A1* | 6/2013 | Xiao | G06F 3/1288 358/1.13 |
| 2013/0222827 A1* | 8/2013 | Watanabe | G06F 3/122 358/1.15 |
| 2013/0235402 A1* | 9/2013 | Yamamichi | G06F 3/1224 358/1.13 |
| 2014/0111824 A1* | 4/2014 | Onishi | H04N 1/00938 358/1.13 |
| 2015/0234621 A1* | 8/2015 | Kimura | G06F 3/1203 358/1.15 |
| 2015/0242722 A1* | 8/2015 | Watanabe | G06F 3/1257 358/1.15 |
| 2015/0378646 A1* | 12/2015 | James | G06F 3/1211 358/1.15 |
| 2017/0228201 A1* | 8/2017 | Taylor | H04L 41/0803 |

* cited by examiner

PRINTER DRIVER PROFILES

RELATED APPLICATIONS

This application is related to and claims priority from U.S. Provisional Patent Application Ser. No. 62/692,535, filed Jun. 29, 2018 for "UTILIZING A GENERIC PRINTER DRIVER PROFILE," which is incorporated herein by reference.

TECHNICAL FIELD

The present disclosure generally relates to computers and computer-related technology. More specifically, the present disclosure relates to printer driver profiles.

BACKGROUND

Computer technologies continue to advance at a rapid pace. Computers commonly used include everything from hand-held computing devices to large multi-processor computer systems. These computers include software operating systems and applications that include user interfaces, in order to make them useful and accessible to an end user. Computers are increasingly linked with other computers and other devices, such as printers, through networks.

One of the challenges involved with computers is configuring printer settings. Configuring printer settings may require a technician to configure each computer individually by installing printer drivers and configuring printer settings. This can be a time-consuming process.

DETAILED DESCRIPTION

Figure 1:
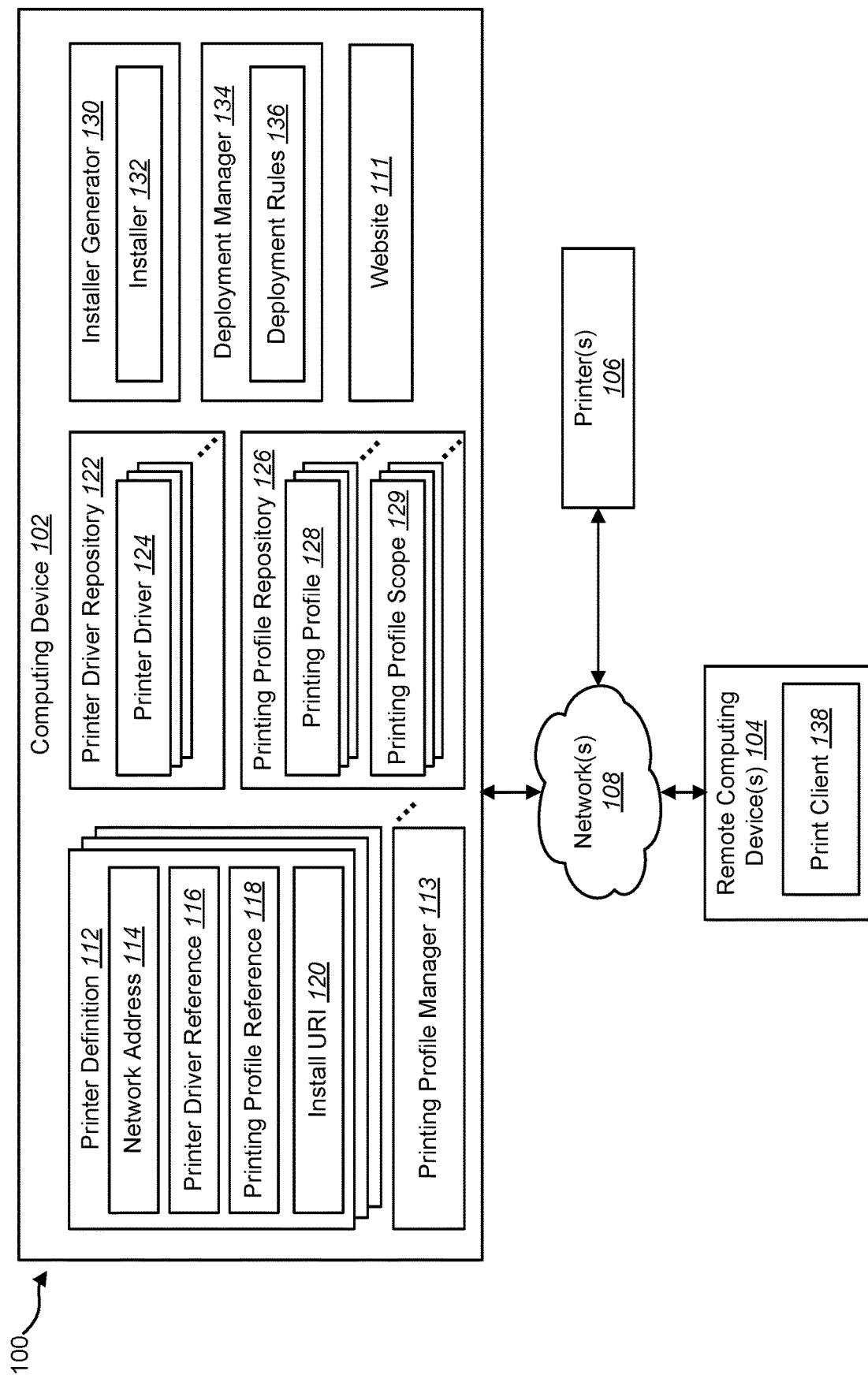
FIG. 1 is a block diagram illustrating one configuration of a system for configuring printer settings for a printer.

A method for configuring, via a website, printer settings for a printer is described. The method includes determining a printer driver for the printer. The method also includes determining at least one printing profile scope of a set of printing profile scopes that includes the printer driver. The at least one printing profile scope includes a plurality of printer drivers. The method further includes determining at least one printing profile for the printer based on the at least one printing profile scope. The at least one printing profile is applicable to the plurality of printer drivers. The method additionally includes presenting the at least one printing profile.

The method may include determining a selected printing profile from the at least one printing profile. Determining the at least one printing profile may include determining the at least one printing profile from a data structure based on the printer driver. Each of the printing profile scopes may be indicated based on a set of operating systems, one operating system, a system configuration, a set of manufacturers, or one manufacturer.

The at least one printing profile may be applicable to multiple printer drivers in accordance with a corresponding printing profile scope. The at least one printing profile may include printer settings for one or more printing options.

The method may include creating, via the website, a printing profile. Creating the printing profile may include determining, from a second set of printing profile scopes, a printing profile scope associated with the printing profile.

The printing profile may be compatible with printer drivers from different manufacturers. The printing profile may be compatible with multiple printer drivers for multiple printer models.

A computing device is also described. The computing device includes a processor. The computing device also includes memory in electronic communication with the processor. The computing device further includes instructions stored in the memory. The instructions are executable to determine a printer driver for a printer. The instructions are also executable to determine at least one printing profile scope of a set of printing profile scopes that includes the printer driver. The at least one printing profile scope includes a plurality of printer drivers. The instructions are further executable to determine at least one printing profile for the printer based on the at least one printing profile scope. The at least one printing profile is applicable to the plurality of printer drivers. The instructions are additionally executable to present the at least one printing profile.

A non-transitory tangible computer-readable medium is also described. The computer-readable medium includes code for causing a computing device to determine a printer driver for a printer. The computer-readable medium also includes code for causing the computing device to determine at least one printing profile scope of a set of printing profile scopes that includes the printer driver. The at least one printing profile scope includes a plurality of printer drivers. The computer-readable medium further includes code for causing the computing device to determine at least one printing profile for the printer based on the at least one printing profile scope. The at least one printing profile is applicable to the plurality of printer drivers. The computer-readable medium additionally includes code for causing the computing device to present the at least one printing profile.

Systems and methods for printer driver profiles are described herein. Configuring printer settings is one current problem, particularly for organizations that use multiple printers. For example, a user may typically be required to individually set up printer settings for each kind of printer on a network. This may waste resources for a user that has to repeatedly deploy settings for different kinds of printers.

Printers often operate in conjunction with printer drivers. A printer driver is software that is executed to format data for communication with a printer. For example, a computing device may utilize a printer driver to format a print job to be sent to a printer for printing. In some cases, printer drivers may be designed to operate with a specific printer or printers. For example, a printer driver may be compatible with a single printer model or multiple printer models. For instance, some printer drivers may function only with a specific model, only with a number of models, with some or all models from a particular manufacturer, etc. In some examples, printer drivers may provide one or more printing options.

Printing options are options that may be selected or set to configure printer operation. Examples of printing options include duplexing, duplexing type, color or black and white printing, landscape or portrait printing, paper size, pages per sheet, print quality, paper source (e.g., print tray), paper type, collation, stapling, hole punching, personal identification number (PIN), etc. In some examples, different printer drivers may provide different options. For instance, some printer drivers may provide options for duplexing, while others may not. Some printer drivers may provide options for print quality, while others may not. Some printer drivers may provide options for stapling or hole punching, while others may not.

A setting or settings may be an option or options that are selected or set. For instance, examples of settings for the paper size option may include letter, A4, 8.5×11 (inches), etc. Examples of settings for the paper type option may include regular, bond, colored paper, etc. Examples of settings for the duplexing option may include duplexing activated or duplexing deactivated. The term "settings" may denote one or more settings herein.

A printing profile may indicate one or more printer settings, or how one or more printing options are set (e.g., which paper type is set, whether color printing is set, etc.). For example, a printing profile may be data, information, and/or a programmatic object that indicates one or more printer settings. The printer setting(s) may correspond to one or more printing options.

Some examples of the systems and methods described herein may address the aforementioned problem (i.e., having to individually set up printers) using a scope or scopes associated with printing profile(s). A printing profile scope is a mechanism (e.g., data structure, program, programmatic object, information, and/or data, etc.) that enables a printing profile to apply to multiple printer drivers.

In some configurations, printing profile scope may indicate and/or include one or more printing options that are applicable to printer drivers within the printing profile scope. For example, a general printing profile scope that includes printer drivers for many operating systems may include one printing option (e.g., black and white printing or color printing) that is common to all the printer drivers associated with the operating systems. Another example of a printing profile scope may include a few printing options that are common to all printer drivers associated with one operating system (e.g., Windows, Macintosh operating systems, etc.). Another example of a printing profile scope may include numerous printing options that are common to all printer drivers associated with one printer manufacturer or brand. Printing profile scopes may be utilized to map printing profiles to printer drivers that are within a printing profile scope. For example, different kinds of printer drivers (e.g., printer drivers associated with different operating systems, printer drivers associated with different printer manufacturers, etc.) may include some common printing options. A printing profile at a particular printing profile scope may indicate one or more printing settings that are applicable to the common printing options of all of the printer drivers within the printing profile scope.

Utilizing printing profile scopes may accordingly allow a printing profile to be mapped to many different printer drivers. For example, a printing profile may be created at a printing profile scope for one operating system. The printing profile may then be applied to a variety of printer drivers associated with the one operating system. This approach may enable efficiently propagating a uniform printing profile for many different printer drivers.

Various configurations of the systems and methods are now described with reference to the Figures. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system 100 for configuring printer settings for a printer 106. The system 100 includes a computing device 102, one or more remote computing devices 104, and/or one or more printers 106. The remote computing device(s) 104 may communicate with the computing device 102 via one or more networks 108. Examples of the network(s) 108 may include one or more local area networks (LANs), one or more wide area networks (WANs), one or more personal area networks (PANs), one or more metropolitan area networks (MANs), the Internet, and/or combinations thereof.

One or more remote computing devices 104 may be configured to communicate with the network(s) 108. Examples of the computing device 102 and/or the remote computing device 104 may include servers, desktop computers, laptop computers, tablet computers, smartphones, tablet devices, etc.

In an implementation, a network 108 may be a small network. For example, the network 108 may include fifty or fewer printers 106. In another implementation, the network 108 may belong to a large organization where the network 108 may include different subnets and/or may be spread across different geographic regions. In some examples, the network 108 may include many (e.g., hundreds or thousands of) printers.

One of the challenges involved with computing is configuring printer settings for one or more remote computing devices 104 on the network(s) 108. To properly operate with a printer 106, a remote computing device 104 may be configured with a printer driver 124 and a printing profile 128. As described above, a printer driver 124 may be software that may be executed to convert data to be printed to a format specific for a printer 106.

A printing profile 128 may include one or more settings for a printer 106. Examples of settings may include a selection or selections of source (e.g., tray) options, paper options, paper sizes, collation options, dots-per-inch (DPI) options, color options (e.g., color or black and white), orientation (e.g., landscape or portrait) options, print quality options, print speed options, watermark options, pages per sheet options, binding (e.g., stapling) options, hole punching options, PIN options, name, comment, location, etc. Accordingly, a printing profile 128 may indicate one or more selected or customized printer settings or attributes. For example, a printing profile may include printer settings for one or more printing options. A printing profile 128 may include a name. For example, the computing device 102 may receive a user input from an input device (e.g., keyboard, mouse, touchscreen, microphone, controller, etc.) indicating a name when a printing profile 128 is created. For example, a user may name a printing profile 128 "BlackWhiteLandscape," "2SidedColor," "FastLowQuality," etc.

The computing device 102 may include one or more printer definitions 112, a printing profile manager 113, a printer driver repository 122, a printing profile repository 126, an installer generator 130, and/or a deployment manager 134. Although illustrated as a single entity, the computing device 102 may include one or multiple entities. For example, the computing device 102 may comprise one or more load-balancing routers, one or more web servers, one or more application servers, and/or one or more database servers in operable communication with each other.

In some examples, the computing device 102 may be accessible via the network(s) 108. For instance, the computing device 102 may be accessible via a LAN. Additionally or alternatively, the computing device 102 may host a website 111 that is accessible via the network(s) 108. In some configurations, the computing device 102 may also be referred to as a Software as a Service (SaaS) instance. For example, the computing device 102 may be one or more computing devices that provide a virtual server instance that is accessible from a public or private cloud network.

The printer driver repository 122 may store one or more printer drivers 124. The printing profile repository 126 may store one or more printing profiles 128. As described above, a printing profile 128 may comprise one or more settings for one or more printers 106. Examples of different printer drivers 124 may include different printer drivers 124 for different models of printers 106, different versions of printer drivers 124 corresponding to different operating systems, different versions of printer drivers 124 corresponding to different system configurations (e.g., 32-bit, 64-bit, etc.), and/or different printer drivers 124 corresponding to different manufacturers, etc.

In some configurations, the printer driver repository 122 may store one or more printing profile scopes 129. As described above, a printing profile scope 129 may indicate a scope of applicability for one or more of the printing profile(s) 128. A printing profile scope 129 may be defined in terms of which options are included in the scope, based on operating system(s), and/or based on manufacturer(s) (e.g., printer manufacturer(s), printer driver 124 manufacturer(s)), etc. Examples of printing profile scopes 129 may indicate all operating systems, a set of operating systems, one operating system, a set of manufacturers, a manufacturer, one or more printer drivers 124, etc. Each of the printing profile scopes 129 may indicate and/or may be associated with one or more printing options for each of the printing profiles 128. In some examples, a printer driver 124 may be included in or mapped to a printing profile scope 129 if all of the options of the printing profile scope 129 are settable by the printer driver 124. In some approaches, a printer driver 124 may have more options than are included in a printing profile scope 129, but may have at least those options specified by the printing profile scope 129 to be included in the printing profile scope 129. A printing profile 128 may be at a (e.g., may correspond to a) printing profile scope 129 if the printing profile 128 specifies settings for options that are included in the printing profile scope 129.

In some configurations, the printing profile manager 113 may create the one or more printing profiles 128. For example, the printing profile manager 113 may create, via the website 111 and/or a user interface, one or more printing profiles 128. Creating the one or more printing profiles 128 may include determining a printing profile scope 129 associated with one or more of the printing profiles 128. For example, when a printing profile 128 is created, a printing profile scope 129 may be selected from a set of printing profile scopes 129 (e.g., pre-existing printing profiles scopes 129), or a new printing profile scope 129 may be created. For example, the computing device 102 may receive input (via an input device and/or via the network(s) 108) indicating a selection of a printing profile scope 129 associated with a printing profile that is being created or edited. For example, the printing profile manager 113 may receive a selection of a printing profile scope 129 via a drop-down list that includes a set of printing profile scopes 129. For example, the set of printing profile scopes 129 may be indicated and/or selected according to operating system (e.g., Microsoft Windows, Mac OS X, Linux, etc.), different versions of operating systems (e.g., Windows XP, Windows Vista, Windows 7, Windows 8, Windows 10, Mac operating system(s), etc.), and different system configurations (e.g., 32-bit, 64-bit, etc.), manufacturer (e.g., Epson, HP, Brother, Ricoh, Canon, Xerox, etc.), and/or combinations thereof, etc.

In some approaches, a printing profile scope 129 may be determined based on a selection of operating system(s), system configuration(s), and/or manufacturer(s). For example, the computing device 102 may receive one or more selection indicators via a user interface, where the selection indicator(s) indicate a selection of operating system(s), system configuration(s), and/or manufacturer(s). The computing device 102 may determine one or more printer drivers 124 that are compatible with the selection. The printing profile scope 129 may be determined based on one or more options that are common to the printer drivers 124. For example, the printing profile scope 129 may be determined as a scope that includes the intersection of options provided by the printer driver(s) 124 determined from the selection.

In some approaches, a printing profile scope 129 may be determined based on a selection of printer drivers. For example, the computing device 102 may receive one or more driver indicators via a user interface, where the driver indicator(s) indicate a selection of printer drivers 124. The printing profile scope 129 may be determined based on one or more options that are common to the selection of printer drivers 124. For example, the printing profile scope 129 may be determined as a scope that includes the intersection of options provided by the selection of printer driver(s) 124.

In some approaches, a printing profile scope 129 may be determined based on an indication of one or more options. For example, the computing device 102 may receive one or more option indicators via a user interface, where the option indicator(s) indicate an option or options. The printing profile scope 129 may be determined based on the one or more options. For example, the printing profile scope 129 may be determined as a scope that includes the indicated option(s) provided by one or more printer drivers 124. Each printing profile scope 129 may include (e.g., be applicable to) one or more printer drivers 124.

In some configurations, creating a printer profile 128 may include determining one or more settings for one or more printing options in accordance with the scope. For example, the computing device 102 may receive (via an input device, user interface, and/or the network(s)) an indication (e.g., selection) of the one or more settings for the one or more printing options in accordance with a scope. For example, the computing device 102 may generate a user interface for selecting settings for one or more printing options in accordance with the scope.

In some configurations, the computing device 102 may determine a printer driver 124 for a printer. For example, the computing device 102 may determine a printer driver 124 to be used for a printer during printer definition 112 creation and/or editing. In some configurations, the computing device 102 may receive an input (via an input device and/or the network(s) 108) indicating a printer driver for a printer.

In some configurations, the computing device 102 may determine at least one printing profile scope 129 that includes the printer driver 124 for the printer. For example, the computing device 102 (e.g., printing profile manager 113) may determine which of the printing profile scope(s) 129 include the printer driver 124. A printing profile scope 129 may "include" a printer driver in a case that the printer driver is mappable to or associated with the printing profile scope 129. For instance, a printing profile scope 129 may be mappable to or associated with a printing profile scope 129 if all of the options of the printing profile scope 129 are provided by (e.g., selectable or configurable) by the printer driver 124. In some approaches, determining the printing profile scope(s) 129 may include determining which of the printing profile scope(s) 129 is or are mapped to the printer driver 124. For example, the computing device 102 may include a look-up table or other data structure that maps the printer driver 124 to one or more printing profile scopes 129. In some configurations, the mapping may be based on option(s) of the printing profile scope 129 that intersect with the option(s) of the printer driver 124. For example, the computing device 102 may utilize the look-up table (or a database or other data structure) to determine whether the options of the printing profile scope(s) 129 are also provided by the printer driver 124. Additionally or alternatively, the computing device 102 may determine whether the printing options (e.g., all of the printing options) of each of the printing profile scopes 129 are applicable to the printer driver 124. For example, if all of the printing option(s) of a printing profile scope 129 are included in or applicable to printer driver 124, then the printer driver 124 may be included within the printing profile scope 129. It should be noted that some printing profile scopes 129 may include (e.g., may be applicable to) multiple different printer drivers 124.

In some configurations, the computing device 102 may determine at least one printing profile 128 for the printer(s) 106 based on the at least one printing profile scope 129. For example, the computing device 102 (e.g., printing profile manager 113) may determine which of the printing profile(s) 128 are mapped to the printing profile scope 129. For instance, the computing device 102 may include a look-up table or other data structure that maps the printing profile scope 129 to the printing profile(s) 128. In some examples, each printing profile 128 may be associated with a printing profile scope 129 when each printing profile 128 is created. For instance, a look-up table (or database or other data structure) may record a printing profile scope 129 associated with the printing profile 128. In some examples, the printing profile 128 may be applicable to multiple printer drivers 124. For instance, the printing profile 128 may function in a one-to-many relationship with multiple printer drivers 124. In some configurations, a single printing profile 128 may be applied for multiple different printer drivers 124 corresponding to multiple different printers 106 (e.g., different printer models, different printer manufacturers, etc.). For instance, a single printing profile 128 may be used by one or more computing devices (e.g., remote computing devices 104) to interoperate with multiple different printers 106.

In some configurations, the computing device 102 may present the printing profile(s) 128 for the printer 106. For example, the computing device 102 may produce a list (e.g., drop-down list, radio button list, etc.), of the printing profiles 128 that are applicable to the printer driver(s) 124 for the printer(s) 106.

In some configurations, the computing device 102 may determine a selected printing profile 128 for the printer 106. For example, the computing device 102 may receive an input (via an input device and/or the network(s) 108) indicating a selection of a printing profile 128 for the printer 106. In some approaches, a printing profile reference 118 corresponding to the selected printing profile 128 may be included in a printer definition 112 (when creating and/or editing a printer definition 112 for the printer 106, for example). The printing profile reference 118 may be utilized to apply settings (e.g., default settings) to the printer 106 when the printer (e.g., printer driver 124) is installed and/or configured on one or more remote computing devices 104. In some configurations, printer definition 112 creation and/or printer installation may be performed in accordance with the following.

In some configurations, the computing device 102 may create a printer definition 112 for one or more printers 106. A printer definition 112 may comprise a network address 114, one or more printer driver references 116, one or more printing profile references 118 and one or more install uniform resource identifiers (URI) 120. In an implementation, the network address 114 may be an Internet Protocol (IP) address of the printer 106. In another implementation, the network address 114 may include a hostname of the printer 106.

Each of the printer driver references 116 may uniquely identify a respective printer driver 124 stored in the printer driver repository 122. Each of the printing profile references 118 may uniquely identify a respective printing profile 128 stored in the printing profile repository 126.

The install URI 120 may specify an access mechanism and a location for downloading an installer 132 generated by the installer generator 130. In an implementation, the install URI 120 may include a Uniform Resource Locator (URL) or Uniform Resource Name (URN) that identifies the computing device 102 as a source for an installer 132 or deployment rules 136 to configure a printer 106.

In some configurations, a service provider may utilize a SaaS deployment of printer drivers 124 and printing profiles 128 to simplify the delivery of print services to an organization. An example of a service provider includes a managed print services (MPS) that provides print services to a user or users (e.g., customer, organization, business, etc.). Another example of a service provider is an information technology (IT) administrator that provides IT services to an organization.

In some configurations, a service provider may use the remote computing device 104 to access a website 111 hosted by the computing device 102 via the network(s) 108. The service provider may use the website 111 to create a printer definition 112 for a printer 106 that has been or will be provided to a user. The service provider may specify a network address 114 (e.g., IP address or hostname) for the printer 106. The service provider may upload one or more printer drivers 124 for the printer 106. This may include separate printer drivers 124 for different operating systems (e.g., Microsoft Windows, Mac OS X, Linux, etc.), different versions of operating systems (e.g., Windows XP, Windows Vista, Windows 7, Windows 8, Windows 10, etc.), and/or different system configurations (e.g., 32-bit, 64-bit, etc.), etc. In some configurations, the computing device 102 may create one or more printing profiles 128 based on user (e.g., service provider) input.

In some configurations, after creating the printer definition 112, the computing device 102 may enable installing a printer and/or changing printer settings in accordance with a printing profile 128. For example, the computing device 102 may determine a printer driver 124 for the printer 106, which may enable determination and/or selection of a printing profile 128 for the printer 106.

In some configurations, the computing device 102 may provide either an installer 132 or deployment rules 136 to configure a remote computing device 104 to communicate with the printer 106 using the printer definition 112. In some implementations, the computing device 102 may include an installer generator 130.

The installer generator 130 may generate an installer 132 based on a printer definition 112. The installer 132 may be run by a remote computing device 104. Running the installer 132 may configure the remote computing device 104 to communicate with a printer 106. Configuring the remote computing device 104 to communicate with the printer 106 may comprise creating a network printer port based on the network address 114 in the printer definition 112, installing the printer driver 124 referenced in the printer definition 112, and configuring settings for the printer 106 based on the printing profile 128 referenced in the printer definition 112. For example, one or more printing profiles 128 may be loaded with the installation of one or more printer drivers 124. For instance, a printing profile 128 may be set as a default printing profile for a remote computing device 104 and/or one or more printing profiles 128 may be provided for selection when a remote computing device 104 utilizes a printer 106.

In some configurations, the computing device 102 may send an install URI 120 to the remote computing device 104 via the network(s) 108. In an implementation, the install URI 120 may be sent in an email, a text message, an instant message, etc. In another implementation, the install URI 120 may be added to a deployment rule 136, as described below.

The install URI 120 may be activated on a remote computing device 104. For example, a user may click on a link in an email. The remote computing device 104 may send an indication to the computing device 102 that the install URI 120 has been activated by the user.

The computing device 102 may generate an installer 132 based on the printer definition 112. In some examples, the installer 132 may be generated based on one or more printing profiles 128 corresponding to one or more printer drivers 124. The computing device 102 may send the installer 132 to the remote computing device 104. In some configurations, the installer 132 is generated when the computing device 102 receives the indication. In other configurations, the computing device 102 generates the installer 132 prior to receipt of the indication. Activating the install URI 120 may cause the remote computing device 104 to download the installer 132.

The remote computing device 104 may next prompt a user to run the installer 132. The installer 132 may create a network printer port on the remote computing device 104 based on the network address 114, install the printer driver 124, and configure the settings for the printer 106 based on the printing profile(s) 128. After the installer 132 has completed, the remote computing device 104 may be configured to communicate with the printer 106 over the network(s) 108. In other words, the remote computing device 104 may be configured to print using the printer 106.

In another approach, the computing device 102 may include a deployment manager 134 that may communicate with a print client 138 on a remote computing device 104. The print client 138 may be a software agent that exists on a remote computing device 104. The print client 138 may be configured to communicate with the computing device 102 via the network(s) 108. In this example, the remote computing device 104 includes the print client 138. It should be noted that the print client 138 may be included on one or more (e.g., all or not all) of the remote computing devices 104.

The deployment manager 134 may generate deployment rules 136 for a given printer 106 based on the printer definition 112. Deployment rules 136 may be assigned to printers 106 and are used to determine if a printer driver 124 or printing profile 128 should be installed on the remote computing device 104. These deployment rules 136 may be created by the administrator and associated with the printer definition 112 of a given printer 106.

In an implementation, the deployment rules 136 can target a specific hostname, group of users, a range of IP address, media access control (MAC) address, serial number, identity provider group/user, or an Active Directory container, organizational unit (OU), computer, user, group, etc. The deployment manager 134 may include targeting rules to determine which remote computing devices 104 should have a printer 106 installed. On the computing device 102, an administrator may assign a deployment rule 136 to the defined printer 106 and/or profile 128. When the print client 138 checks in with the computing device 102, the print client 138 may utilize the deployment rules 136. If a deployment rule 136 applies to the remote computing device 104 or user, the printer driver 124 and printing profile 128 may be installed.

The computing device 102 may send the deployment rules 136 to the print client 138. The deployment rules 136 may include instructions for the print client 138 to install and configure a printer driver 124 and printing profile 128 for a given printer 106. In an implementation, the deployment rules 136 may include information included in a printer definition 112. For example, the deployment rules 136 may include an install URI 120. In some examples, a single printing profile 128 may be applied to multiple remote computing devices 104 that interoperate with multiple different printers 106 (e.g., different models of printers 106, printers 106 that utilize different printer drivers 124, etc.). For instance, a single printing profile 128 may be assigned to be applied to a set of remote computing devices 104 (e.g., IP address range of computing devices, a selected set of computing devices, computing devices on a subnet or subnets, computing devices with particular device names, etc.).

In an implementation, the printer definition 112 may include a list of remote computing devices 104 that are to be configured to communicate with a given printer 106. For example, a service provider may indicate, via the website 111, which computing devices 104 should be configured to print to a given printer 106. The computing device 102 may maintain a list of these computing devices 104 in the printer definition 112.

After creating the printer definition 112 for the printer 106, the computing device 102 may send the deployment rules 136 to the print client 138. For example, the computing device 102 may send an install URI 120 to the remote computing device 104 via the network(s) 108. In an implementation, the computing device 102 may only send the deployment rules 136 to the print client 138 that requests them. One or more print clients 138 may check in with the server 102 for things to do on a configurable basis.

Upon receiving the deployment rules 136, the print client 138 may create a network printer port on the remote computing device 104 based on the network address 114. The print client 138 may also contact the computing device 102 to acquire a printer driver 124 and a printing profile 128 for the printer 106. The print client 138 may install the printer driver 124, and configure the settings for the printer 106 based on the printing profile 128. After the print client 138 has completed, the remote computing device 104 may be configured to communicate with the printer 106 over the network(s) 108. In other words, the remote computing device 104 may be configured to print using the printer 106. In some configurations, rather than have an end-user to click an email or go to a portal and select to install the printer 106, the print client 138 may perform the printer driver 124 installation and configuration.

The systems and methods described herein may be beneficial with smaller organizations that may not have dedicated information technology (IT) staff. Benefits may also be realized by larger organizations that wish to simplify printer management. Additionally, the SaaS or server deployment may be printer agnostic (i.e., include support for all printer brands and models). Other approaches (e.g., print servers) may be limited in the types of printers supported. Some examples of the described systems and methods provide automated printer installation without the use of a print server. This may provide results for deploying a printer 106 in an organization while keeping costs and network overhead down. For instance, some configurations of the systems and methods described herein may be beneficial to avoid configuring separate print profiles (e.g., default or optional print profiles) for each different printer that uses a different print driver. Accordingly, some examples of the systems and methods disclosed herein may simplify configuring print profiles to a variety of different printers with different print drivers (e.g., different print drivers for different operating systems, system configurations, manufacturers, etc.).

Figure 2:
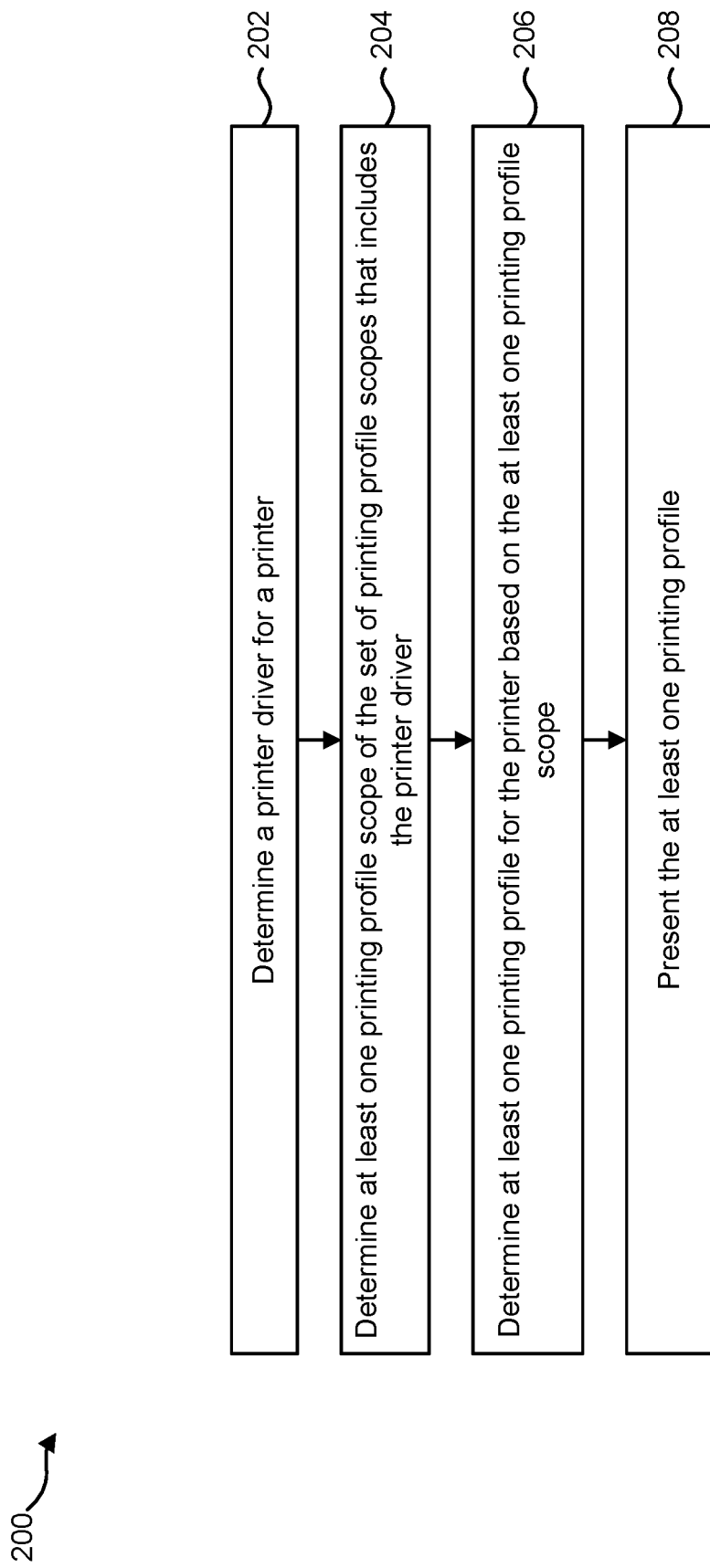
FIG. 2 is a flow diagram illustrating one configuration of a method for configuring printer settings for a printer.

FIG. 2 is a flow diagram illustrating one configuration of a method 200 for configuring printer settings for a printer. In some configurations, the method 200 may enable a remote computing device 104 to communicate with a printer 106 by receiving one or more printer drivers 124 and/or one or more printing profiles 128 from a central host, for example, via the network(s) 108. The method 200 may be implemented by a computing device 102 in communication with a remote computing device 104.

In some configurations, the computing device 102 may create, via a website 111, a printing profile. This may be accomplished as described in connection with FIG. 1. For example, the computing device 102 may receive one or more inputs to create a printing profile. The input(s) may indicate one or more selected options (e.g., settings). As described above, the printing profile may have an associated printing profile scope. For instance, the printing profile (e.g., settings) may be applicable to a set of printer drivers within the printing profile scope (e.g., printer drivers that can apply the printing profile settings). In some examples, creating the printing profile may include determining, from a set of printing profile scopes, a printing profile scope associated with the printing profile.

The computing device 102 may determine 202 a printer driver for the printer. This may be accomplished as described in connection with FIG. 1. For example, the computing device 102 may receive an indication of the printer driver for a printer. In some configurations, the indication may be received via a user interface. For instance, a user may specify a printer driver to be utilized with a particular printer.

The computing device 102 may determine 204 at least one printing profile scope of the set of printing profile scopes that includes the printer driver for the printer. This may be accomplished as described in connection with FIG. 1. For example, the computing device 102 may look up one or more printing profile scopes that are applicable to the printer driver.

The computing device 102 may determine 206 at least one printing profile for the printer based on the at least one printing profile scope. This may be accomplished as described in connection with FIG. 1. For example, the computing device 102 may determine one or more printing profiles associated with the printing profile scope.

The computing device 102 may present 208 the at least one printing profile. This may be accomplished as described in connection with FIG. 1. For example, the computing device 102 may populate a drop-down list (or other interactive control, for instance) with printing profiles that are associated with the printing profile scope(s). Presenting may include displaying the at least one printing profile on a screen and/or sending the at least one printing profile to a remote computing device (to be displayed and/or otherwise output).

Figure 3:
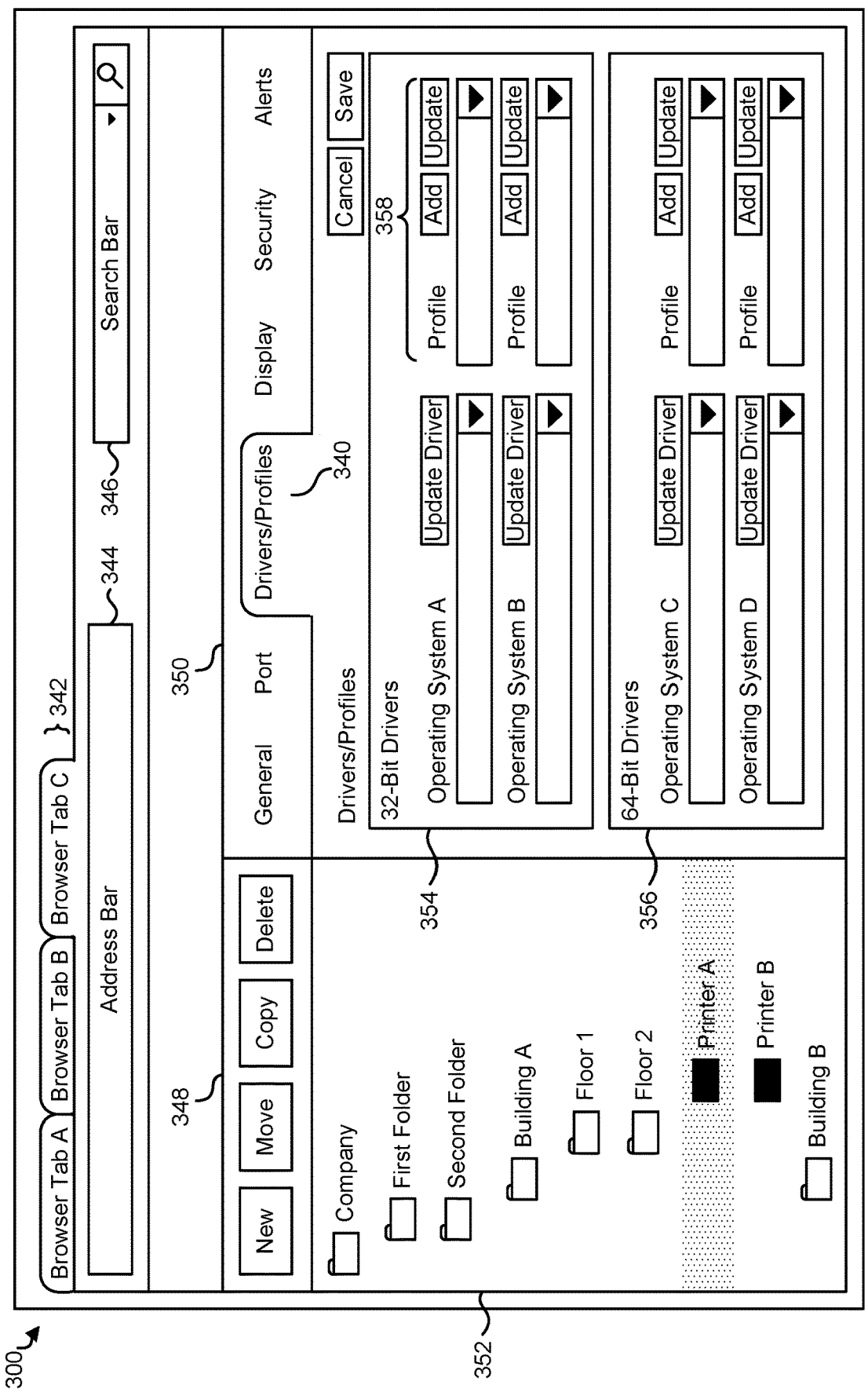
FIG. 3 is a diagram illustrating an example of a user interface in which one or more printing profiles may be presented based on printing profile scope.

FIG. 3 is a diagram illustrating an example of a user interface (UI) 300 in which one or more printing profiles may be presented based on printing profile scope. The UI 300 may be presented by a computing device (e.g., computing device 102, remote computing device 104).

In the example illustrated in FIG. 3, the UI 300 is a browser window. For example, the browser window may include one or more browser tabs 342, an address bar 344 and/or a search bar 346. In some configurations, the address bar 344 and the search bar 346 may be combined. The browser window may present the website described in connection with FIG. 1 in some examples.

In the example illustrated in FIG. 3, the UI 300 includes printer management buttons 348. For instance, management buttons 348 for creating a new structure entity (e.g., folder or printer), for moving a structure entity (e.g., moving a printer to a different part of the structure), copying a structure entity (e.g., copying details for folder(s) and/or printer(s)), and deleting a structure entity (e.g., deleting folder(s) and/or printer(s)) are shown.

In the example illustrated in FIG. 3, the UI 300 includes a structure panel 352 that presents a structure for printers. In this example, the structure is presented as a tree structure that includes folders and printers. The tree structure may enable presenting printers in an organized fashion. As shown in FIG. 3, folders may be used to represent companies, divisions within companies, geographic locations, and floor locations. Other folders may be utilized to organize printers differently in other examples. As illustrated in FIG. 3, printer A is selected. One or more fields of the UI 300 may be populated based on a selected printer.

In this example, the UI 300 includes printer tabs 350. The printer tabs 350 enable presentation of various details relating to a printer or printers (e.g., general details, port details, drivers/profiles details, display details, security details, alert details, etc.).

In this example, a drivers/profiles tab 340 is selected, which shows an interface for adding or updating drivers for a particular printer (i.e., selected printer A). As illustrated, the tab allows specifying printer drivers corresponding to various computing device operating systems and system configurations. In particular, FIG. 3 illustrates a first panel 354 for 32-bit drivers and a second panel 356 for 64-bit drivers. For instance, when a printer is selected, the UI 300 allows a user to specify and/or update a printer driver for different operating systems and/or for different system configurations. Profile fields 358 (e.g., drop-down lists) are also shown. As described above, when a printer driver is specified for a particular printer, a computing device (e.g., computing device 102) may populate the corresponding profile field 358 with one or more printing profiles included in the printing profile scope corresponding to the selected printer driver. This approach may enable specifying a printing profile that is applicable to a variety of printer drivers. This may avoid the necessity of creating a new profile for every printer driver.

The profile field 358 may enable selection (and/or addition and/or updating) of a printing profile for the selected printer. For example, if any pre-existing profile(s) are associated with the printing profile scope for the specified printer driver, the profile field 358 may be populated with the pre-existing profile(s) to enable selection of the printing profile for the selected printer. Additionally or alternatively, the UI 300 may provide controls (e.g., buttons) for adding (e.g., creating) a new printing profile and/or updating (e.g., editing) a printing profile. For instance, selecting the "Add" button may cause a window to open that allows specifying a new printing profile and/or printing profile scope.

Figure 4:
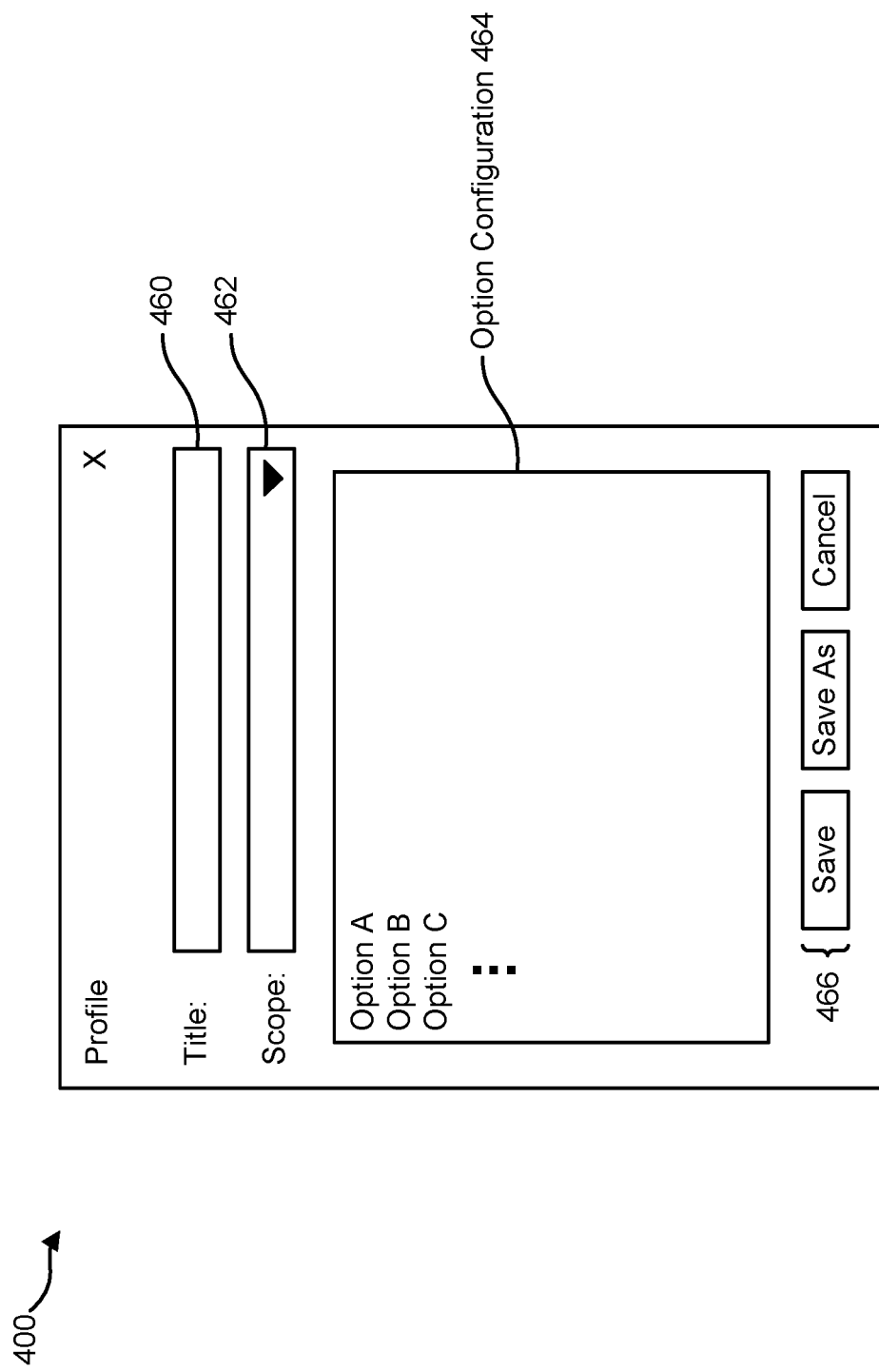
FIG. 4 is a diagram illustrating an example of a user interface that may be utilized to create one or more printing profiles.

FIG. 4 is a diagram illustrating an example of a user interface (UI) 400 that may be utilized to create one or more printing profiles. The UI 400 may be presented by a computing device (e.g., computing device 102, remote computing device 104). In this example, the UI 400 may include a text entry control 460 to receive a text entry for a title or name of a printing profile. The UI 400 may also include a scope entry control 462 to receive an entry or selection of a printing profile scope for the printing profile. For example, a drop-down may show a set of printing profile scopes. As discussed above, the printing profile scope may be indicated in accordance with a set of operating systems, one operating system, system configuration (e.g., 32-bit, 64-bit), set of manufacturers, one manufacturer, etc. When a printing profile scope is specified or selected, the UI 400 may present (in an option configuration area 464, for instance) a set of printing options corresponding to the printing profile scope. In some examples, broader printing profile scopes may include fewer printing options and/or narrower printing profile scopes may include more printing options. For instance, a broad printing profile scope that includes multiple operating systems may include only one option: whether to print in black and white or in color by default. This is because including a large variety of printer drivers in the printing profile scope may reduce the number of printing options that the printer drivers have in common. In another example, a narrower printing profile scope that includes only one manufacturer may include a large number of printing options, due to common print options between printer drivers from the same manufacturer.

The option configuration area 464 may provide an indication of the options that are available at a particular printing profile scope. For example, more options may be presented for a narrower printing profile scope, while fewer options may be presented for a broader printing profile scope. The UI 400 may include one or more buttons 466 for saving the printing profile, saving the printing profile with a specified file name, or canceling the creation or editing of the printing profile.

It should be noted that other approaches may be utilized in other examples of the systems and methods disclosed herein. For example, one or more options may be selected, which may be utilized to establish the printing profile scope for the printing profile.

Figure 5:
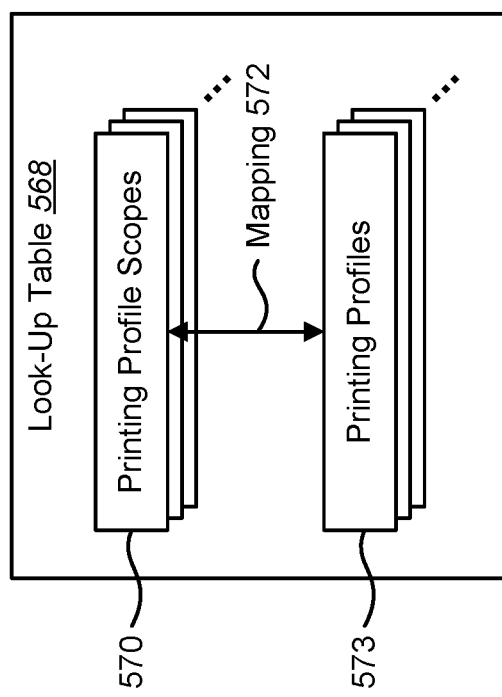
FIG. 5 is a block diagram illustrating one example of a look-up table including printing profile scopes and printing profiles.

FIG. 5 is a block diagram illustrating one example of a look-up table 568 including printing profile scopes 570 and printing profiles 573. In some configurations, the look-up table 568 may be utilized to determine a printing profile 573 based on a printer driver. For example, a computing device (e.g., computing device 102) may look up one or more printing profile scopes 570 corresponding to a printer driver. For instance, the computing device may utilize one or more attributes of a printer driver (e.g., printing options, operating system, computation system, system configuration, manufacturer, etc.) to look-up a corresponding printing profile scope 570. For example, attributes of the printer driver may be mapped to one or more applicable printing profile scopes 570. Based on the applicable profile scope(s) 570, the computing device may determine one or more compatible printing profiles 573 and/or map a printing profile 573 to a printer. The look-up table 568 may return one or more printing profiles 573 associated with the printing profile scope(s) 570 that is or are associated via a mapping 572. The mapping 572 may indicate the printing profile scope 570 specified during creation of the printing profile 573. While the look-up table 568 in FIG. 5 is illustrated as an example, other data structures may be utilized to determine whether a printer driver is within one or more printing profile scopes 570 and/or to determine one or more printing profiles 573 associated with the printing profile scopes 570. As described above, the printing profiles 573 determined may be presented for selection when creating a printer definition and/or when configuring a printer.

Figure 6:
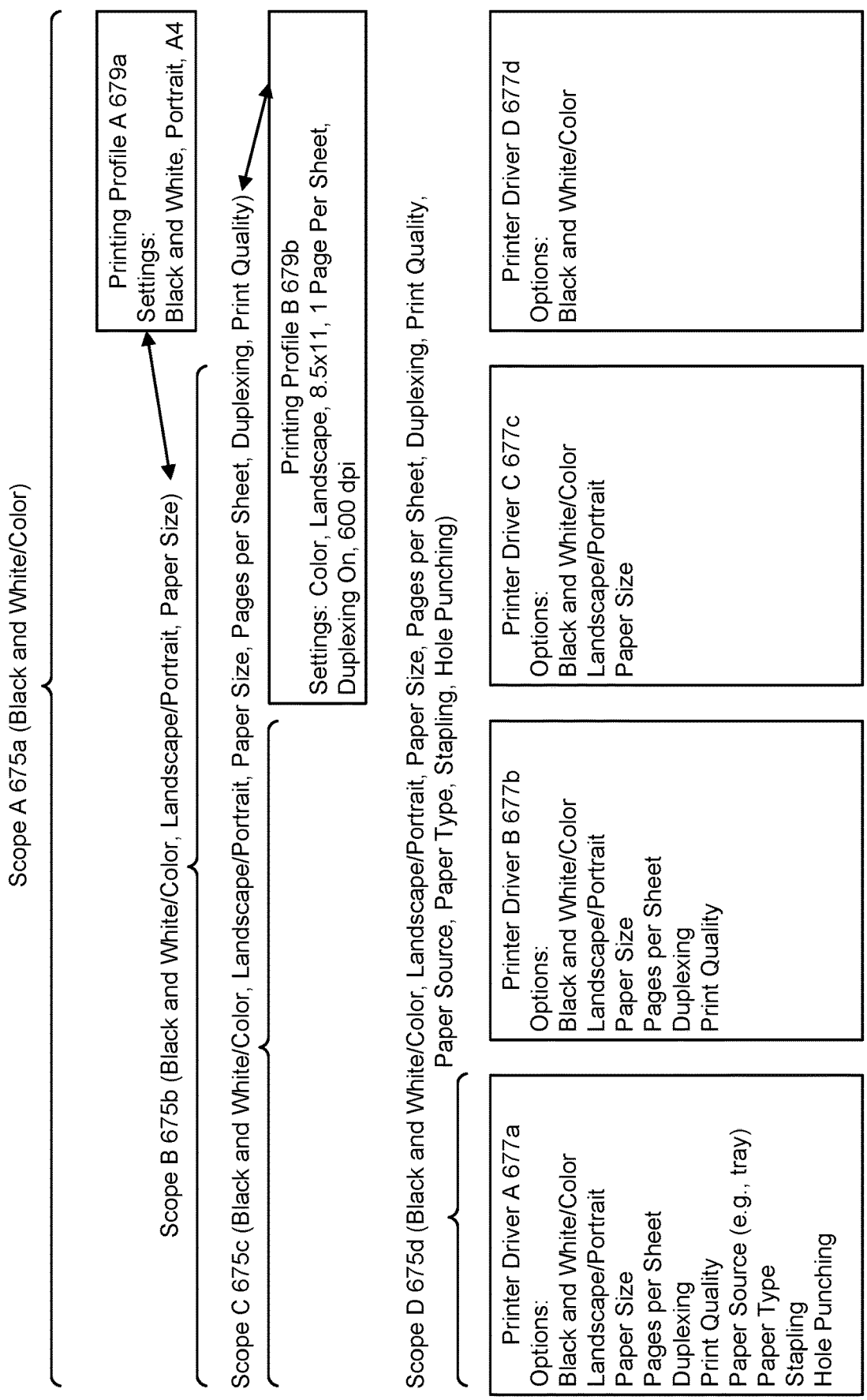
FIG. 6 is a diagram illustrating an example of scopes, printing profiles, and printer drivers in accordance with some configurations of the systems and methods described herein.

FIG. 6 is a diagram illustrating an example of scopes 675*a-d*, printing profiles 679*a-b*, and printer drivers 677*a-d* in accordance with some configurations of the systems and methods described herein. In this example, each of the printer drivers 677*a-d* includes a different number of options for printing. In particular, printer driver A 677*a* includes options for black and white or color, landscape or portrait orientation, paper sizes, pages per sheet, duplexing, print qualities, paper sources, paper types, stapling, and hole punching. Printer driver B 677*b* includes options for black and white or color, landscape or portrait orientation, paper size, pages per sheet, duplexing, and print quality. Printer driver C 677*c* includes options for black and white or color, landscape or portrait orientation, and paper size. Printer driver D 677*d* includes an option for black and white or color.

The example of FIG. 6 also includes multiple scopes 675*a-d* (printing profile scopes). Scope A 675*a* includes one option for printing: black and white or color. Scope A 675*a* is the broadest printing profile scope and is applicable to (e.g., includes) all of the printer drivers 677*a-d* because it has one option that is provided by all of the printer drivers 677*a-d*. Scope B 675*b* includes a few options for printing: black and white or color, landscape/portrait orientation, and paper size. Scope B 675*b* is applicable to (e.g., includes) three of the printer drivers 677*a-c* because it has three options that are provided by three of the printer drivers 677*a-c*. Scope C 675*c* includes several options for printing: black and white or color, landscape/portrait orientation, paper size, pages per sheet, duplexing, and print quality. Scope C 675*c* is applicable to (e.g., includes) two of the printer drivers 677*a-b* because it has six options that are provided by two of the printer drivers 677*a-b*. Scope D 675*d* includes many options for printing: black and white or color, landscape/portrait orientation, paper size, pages per sheet, duplexing, print quality, paper source, paper type, stapling, and hole punching. Scope D 675*d* is applicable to (e.g., includes) one of the printer drivers 677*a* because it has ten options that are provided by one of the printer drivers 677*a*.

The example illustrated in FIG. 6 shows two printing profiles 679*a-b*. Printing profile A 679*a* is associated with scope B 675*b*. In this example, printing profile A 679*a* includes three settings: black and white printing, portrait orientation, and A4 paper size. Because printing profile A 679*a* is at scope B 675*b*, printing profile A 679*a* can be applied to three different printer drivers 677*a-c*.

Printing profile B 679*b* is associated with scope C 675*c*. In this example, printing profile B 679*b* includes six settings: color printing, landscape orientation, 8.5×11 paper size, 1 page per sheet, duplexing activated, and print quality at 600 dpi. Because printing profile B 679*b* is at scope C 675*c*, printing profile B 679*b* can be applied to two different printer drivers 677*a-b*.

In some examples, a computing device (e.g., computing device 102 described in connection with FIG. 1) may receive an indication of a printer driver. For example, printer driver B 677*b* may correspond to a printer to be installed for a remote computing device. In some approaches, the computing device may determine that printer driver B 677*b* is included in three scopes 675*a-c*, because printer driver B 677*b* has options that intersect with all of the options provided in scopes A-C 675*a-c*. The computing device may indicate and/or present any printing profiles associated with scopes A-C 675*a-c*. In this example, the computing device may indicate and/or present printing profiles A-B 679*a-b*, because printing profiles A-B 679*a-b* are associated with or mapped to scopes B-C 675*b-c*. In some examples, the computing device may select printing profile A 679*a*, printing profile B 679*b*, or both printing profiles A-B 679*a-b* to be provided with the installation of printer driver B 677*b*. For example, the computing device may send information or data (e.g., one or more files) that represent the printing profile(s) to a remote computing device. The information or data (e.g., file(s)) may be compatible with the driver being installed. In some configurations, the computing device may format information or data (e.g., files) differently for different drivers. For example, two remote computing devices may interface with two different printers that utilize different printer drivers, but that are within a printing profile scope of a printing profile. Accordingly, for a printing profile, the computing device may format the information or data (e.g., one or more file(s)) that indicates the same settings differently for different printer drivers (to allow compatibility with the different printer drivers, for example).

It may be observed that printing profile A 679*a* may be provided for any of printer drivers A-C 677*a-c*, which illustrates a one-to-many relationship for a printing profile. For example, a printing profile may be compatible with printer drivers from different manufacturers (e.g., printer manufacturers). Additionally or alternatively, a printing profile may be compatible with multiple printer drivers for multiple printer models.

Figure 7:
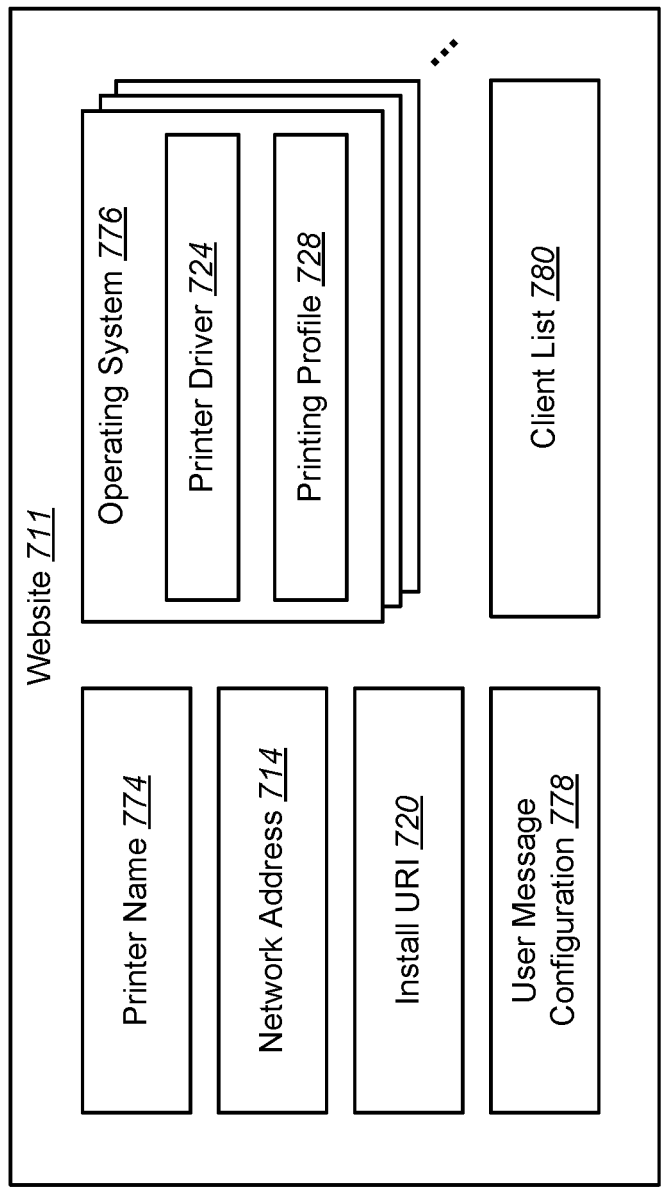
FIG. 7 is a block diagram illustrating a configuration of a website for software-as-a-service (SaaS) deployment of printer drivers and printing profiles.

FIG. 7 is a block diagram illustrating a configuration of a website 711 for software-as-a-service (SaaS) deployment of printer drivers 724 and printing profiles 728. The website 711 may be hosted by a computing device 102. The website 711 may be accessible via the network(s) 108.

The website 711 may provide one or more webpages and/or dialog boxes for presentation on a display. A service provider may access the website 711 to enter information about a printer 106, to provide one or more printer drivers 724, and/or to provide one or more printing profiles 728.

The website 711 may provide one or more webpages for creating a printer definition 112 for a printer 106. The website 711 may provide a printer name component 774 and a network address component 714. The printer name component 774 may be an element (e.g., textbox) for entering the name of the printer 106. The network address component 714 may be an element for entering the network address 114 (e.g., IP address or hostname) of the printer 106.

The website 711 may also include one or more operating system components 776. An operating system component 776 may define a certain operating system that may be used by a remote computing device 104. For example, one operating system component 776 may be used for Windows and another operating system component 776 may be used for Mac OS.

A printer driver 724 and/or printing profile 728 configured for a particular operating system may be included in the operating system component 776 for that particular operating system. For example, a service provider may upload a new printer driver 724 on the website 711. The uploaded printer driver 724 may be associated with the operating system that the service provider selects.

The website 711 may also provide additional components associated with creating a printer definition 112. These components may include a printer location element and/or comments about a printer 106.

The website 711 may provide one or more dialog boxes for selecting a printer driver 124 to associate with a printer 106. The website 711 may provide one or more dialog boxes for specifying options (e.g., settings) for a printing profile 728. As described above, for example, the printing profile 728 may be determined based on one or more printing profile scopes that include a selected printer driver 724. The website 711 may provide a webpage for listing information about a printer definition 112, including an install URI 720.

The website 711 may provide a client list 780 that displays one or more clients (e.g., customers) and the printers 106 that are associated with a given client. In an implementation, the client list 780 may be in the form of a drop-down tree, where each client has a subset of printers 106. The website 711 may include elements (e.g., check boxes) that allow a service provider to select one or more clients and/or printers 106 for SaaS-based deployment of printer drivers 724 and printing profiles 728. In some examples, the website 711 may provide the user interface 300 described in connection with FIG. 3.

The website 711 may also provide a user message configuration component 778 that enables the configuration of messages sent to an end-user. For example, the user message configuration component 778 may be a webpage that enables a service provider to configure an email that is sent to an end user to assist in installing a printer driver 724 and/or printing profile 728.

Figure 8:
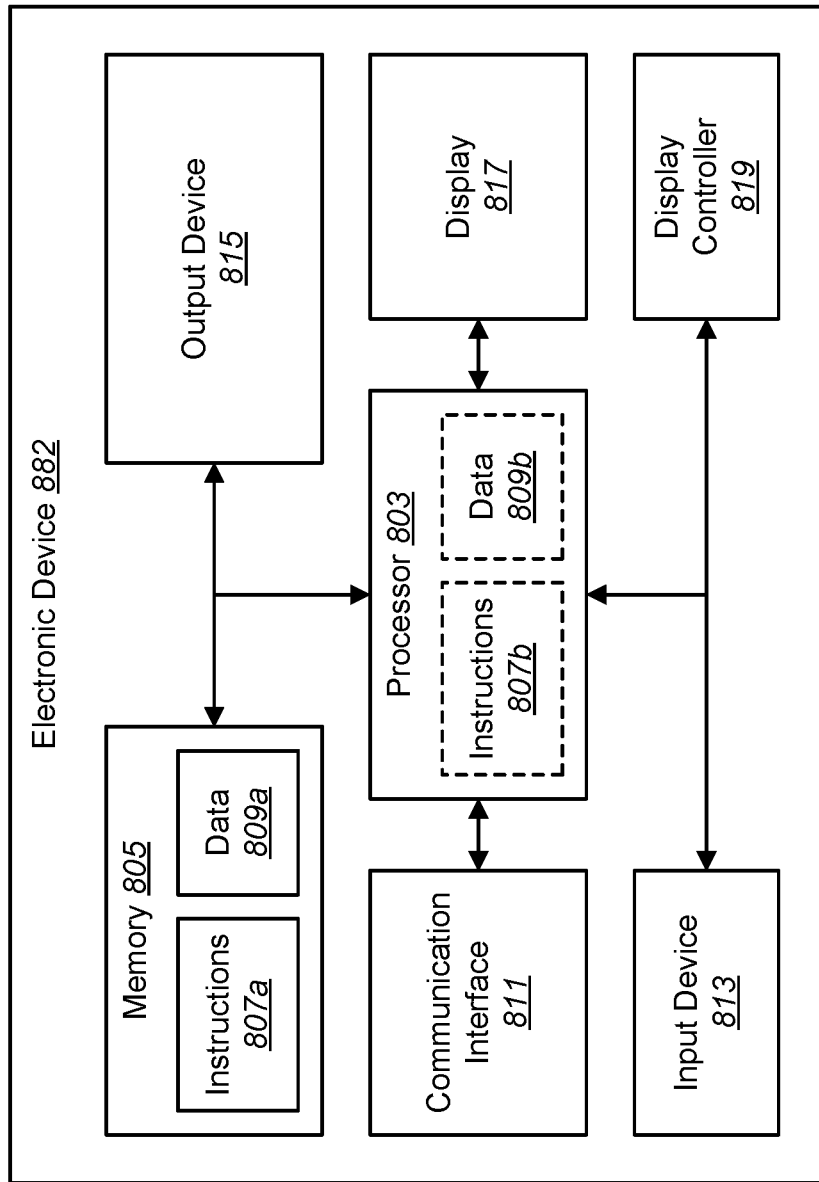
FIG. 8 illustrates various components that may be utilized in an electronic device.

FIG. 8 illustrates various components that may be utilized in an electronic device 882. The electronic device 882 may be configured in accordance with one or more of the computing devices 102, 104 described herein.

The electronic device 882 may include a processor 803 and memory 805. The memory 805 may include instructions 807*a* and data 809*a*. The processor 803 controls the operation of the computing device and may be, for example, a microprocessor, a microcontroller, a digital signal processor (DSP) or other processing device. The processor 803 may perform logical and arithmetic operations based on program instructions 807*b* and/or data 809*b* received from the memory 805.

The electronic device 882 typically may include one or more communication interfaces 811 for communicating with other electronic devices. The communication interfaces 811 may be based on wired communication technology, wireless communication technology or both. Examples of different types of communication interfaces 811 include a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter and so forth.

The electronic device 882 may include one or more input devices 813 and one or more output devices 815. Examples of different kinds of input devices 813 include a keyboard, mouse, microphone, remote control device, button, joystick, trackball, touchpad, lightpen, etc. Examples of different kinds of output devices 815 include a speaker, printer, etc. One specific type of output device 815 that may be included in a computer system is a display device 817. Display devices 817 used with configurations disclosed herein may utilize any suitable image projection technology, such as liquid crystal display (LCD), light-emitting diode (LED), gas plasma, electroluminescence, a cathode ray tube (CRT) or the like.

A display controller 819 may also be provided, for converting data 809*a* stored in the memory 805 into text, graphics and/or moving images (as appropriate) shown on the display device 817. Of course, FIG. 8 illustrates only one possible configuration of an electronic device 882. Various other architectures and components may be utilized.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory may be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. In some examples, "instructions" and "code" are executable by a processor.

The term "computer-readable medium" refers to any non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for configuring, via a website, printer settings for a printer, comprising:
   determining a printer driver for the printer;
   determining at least one printing profile scope of a set of printing profile scopes that includes the printer driver, wherein the at least one printing profile scope includes a plurality of printer drivers;
   determining at least one printing profile for the printer based on the at least one printing profile scope, wherein the at least one printing profile is applicable to the plurality of printer drivers; and
   presenting the at least one printing profile.

2. The method of claim 1, further comprising determining a selected printing profile from the at least one printing profile.

3. The method of claim 1, wherein determining the at least one printing profile comprises determining the at least one printing profile from a data structure based on the printer driver.

4. The method of claim 1, wherein each of the printing profile scopes is indicated based on a set of operating systems, one operating system, a system configuration, a set of manufacturers, or one manufacturer.

5. The method of claim 1, wherein the at least one printing profile is applicable to multiple printer drivers in accordance with a corresponding printing profile scope.

6. The method of claim 1, wherein the at least one printing profile includes printer settings for one or more printing options.

7. The method of claim 1, further comprising creating, via the website, a printing profile, wherein creating the printing profile comprises determining, from a second set of printing profile scopes, a printing profile scope associated with the printing profile.

8. The method of claim 1, wherein the printing profile is compatible with printer drivers from different manufacturers.

9. The method of claim 1, wherein the printing profile is compatible with multiple printer drivers for multiple printer models.

10. A computing device, comprising:
a processor;
memory in electronic communication with the processor; and
instructions stored in the memory, wherein the instructions are executable to:
determine a printer driver for a printer;
determine at least one printing profile scope of a set of printing profile scopes that includes the printer driver, wherein the at least one printing profile scope includes a plurality of printer drivers;
determine at least one printing profile for the printer based on the at least one printing profile scope, wherein the at least one printing profile is applicable to the plurality of printer drivers; and
present the at least one printing profile.

11. The computing device of claim 10, wherein the instructions are executable to determine a selected printing profile from the at least one printing profile.

12. The computing device of claim 10, wherein the instructions are executable to determine the at least one printing profile from a data structure based on the printer driver.

13. The computing device of claim 10, wherein each of the printing profile scopes is indicated based on a set of operating systems, one operating system, a system configuration, a set of manufacturers, or one manufacturer.

14. The computing device of claim 10, wherein the at least one printing profile is applicable to multiple printer drivers in accordance with a corresponding printing profile scope.

15. The computing device of claim 10, wherein the at least one printing profile includes printer settings for one or more printing options.

16. The computing device of claim 10, comprising executable instructions to create, via a website, a printing profile, wherein creating the printing profile comprises determining, from a second set of printing profile scopes, a printing profile scope associated with the printing profile.

17. The computing device of claim 10, wherein the printing profile is compatible with printer drivers from different manufacturers.

18. The computing device of claim 10, wherein the printing profile is compatible with multiple printer drivers for multiple printer models.

19. A non-transitory tangible computer-readable medium, comprising:
code for causing a computing device to determine a printer driver for a printer;
code for causing the computing device to determine at least one printing profile scope of a set of printing profile scopes that includes the printer driver, wherein the at least one printing profile scope includes a plurality of printer drivers;
code for causing the computing device to determine at least one printing profile for the printer based on the at least one printing profile scope, wherein the at least one printing profile is applicable to the plurality of printer drivers; and
code for causing the computing device to present the at least one printing profile.

20. The computer-readable medium of claim 19, further comprising code for causing the computing device to determine a selected printing profile from the at least one printing profile.

* * * * *